United States Patent [19]
Lee

[11] Patent Number: 6,072,652
[45] Date of Patent: Jun. 6, 2000

[54] TECHNIQUE FOR DETECTING STICTION ERROR IN HARD DISK DRIVE

[75] Inventor: Bong-Jin Lee, Seoul, Rep. of Korea

[73] Assignee: SamSung Electronics Co., Ltd., Suwon, Japan

[21] Appl. No.: 08/993,575

[22] Filed: Dec. 18, 1997

[51] Int. Cl.[7] ............................................. G11B 15/18
[52] U.S. Cl. .......................... 360/71; 360/73.03; 360/75
[58] Field of Search .................................. 360/69, 71, 75, 360/73.01, 73.03, 74.1, 70

[56] References Cited

U.S. PATENT DOCUMENTS

| | | | |
|---|---|---|---|
| 4,646,557 | 3/1987 | Park ............................................. | 73/9 |
| 4,809,248 | 2/1989 | Sengoku ...................................... | 369/47 |
| 4,970,610 | 11/1990 | Knappe ....................................... | 360/75 |
| 5,115,664 | 5/1992 | Hegde et al. ................................ | 73/9 |
| 5,117,315 | 5/1992 | Nagasaki et al. ...................... | 360/75 X |
| 5,384,675 | 1/1995 | Crawforth et al. ......................... | 360/75 |
| 5,397,971 | 3/1995 | McAllister et al. ..................... | 318/254 |
| 5,428,284 | 6/1995 | Kaneda et al. .................... | 360/73.03 X |
| 5,530,602 | 6/1996 | Boutaghou et al. ....................... | 360/75 |
| 5,539,592 | 7/1996 | Banks et al. ............................... | 360/75 |
| 5,682,334 | 10/1997 | Plutowski et al. ....................... | 364/565 |
| 5,801,505 | 9/1998 | Lee et al. .............................. | 360/75 X |

FOREIGN PATENT DOCUMENTS

| | | | |
|---|---|---|---|
| 0244459 | 9/1990 | Japan ....................................... | 360/75 |

*Primary Examiner*—Andrew L. Sniezek
*Attorney, Agent, or Firm*—Robert E. Bushnell, Esq.

[57] ABSTRACT

A hard disk drive rapidly shakes a voice coil motor to remove a stiction error caused by a friction force between a head and a disk. A start-up oscillator generates a spindle motor rotation control frequency according to a level of a spindle motor driving control voltage and controls a rotation of a spindle motor according to the spindle motor rotation control frequency. A restart oscillator generates a restart control signal for controlling the level of the spindle motor driving control voltage to restart the rotation of the spindle motor. A resistor is interposed between the restart oscillator and ground, to allow the restart control signal to control the level of the spindle motor driving control voltage, so as to prevent the spindle motor from being restarted. A microcontroller monitors the level of the spindle motor driving control voltage to detect a stiction error and provide a voice coil with a voice coil shaking control signal upon a detection of the stiction error.

7 Claims, 8 Drawing Sheets

FIG. 3a SPM ON(−)
FIG. 3b CRST
FIG. 3c CSTMON
FIG. 3d COSC

FIG. 5a SPM ON(—)
FIG. 5b CRST
FIG. 5c CSTMON
FIG. 5d COSC

FIG. 7a SPM ON(—)
FIG. 7b CRST
FIG. 7c CSTMON
FIG. 7d COSC

FIG. 9

TECHNIQUE FOR DETECTING STICTION ERROR IN HARD DISK DRIVE

CLAIM OF PRIORITY

This application makes reference to, incorporates the same herein, and claims all benefits accruing under 35 U.S.C. §119 from an application for DEVICE AND METHOD FOR DETECTING STICTION ERROR IN HARD DISK DRIVE earlier filed in the Korean Industrial Property Office on the Oct. 20, 1996 and there duly assigned Ser. No. 69199/1996.

BACKGROUND OF THE INVENTION

1. Field of the Invention

The present invention relates to a hard disk drive (HDD), and more particularly to a technique for detecting a stiction error which may be caused by a friction force between a head and a disk in the hard disk drive.

2. Description of the Related Art

With the high storage capacity and the high access speed, a hard disk drive which reads and writes data from and onto a rotating magnetic disk is widely used as an auxiliary memory of a computer system. Such a hard disk drive writes information on tracks arranged along concentric circles on the rotating magnetic disk. A magnetic head accesses the tracks to read and write data from and onto the magnetic disk. In such a hard disk drive, upon a power-up, a controller drives a spindle motor for rotating the magnetic disk in order to initialize the system. In the meantime, when the spindle motor rotates at 1000 rpm, the magnetic head rises from the surface of the magnetic disk. When the spindle motor rotates at a steady-state rotation speed, the system drives a voice coil motor (VCM) for moving the magnetic head. However, when the spindle motor is driven upon the power-up, the magnetic head rubs against the magnetic disk, disturbing a rotation of the spindle motor. Such a phenomenon is called stiction error. A spindle motor shaking technique has been proposed to get rid of the stiction error.

In a hard disk drive, a plurality of disks are rotated by a spindle motor and a plurality of magnetic heads are respectively positioned at corresponding surfaces of the disks. The magnetic heads are mounted on corresponding support arms each extending toward the disks from an assembly associated with a rotary voice coil actuator. A microcontroller generates control commands for the system in response to read and write commands received from a host computer. A voice coil motor driver generates a driving current for driving an actuator in response to a position control signal generated by the microcontroller for controlling the position of the heads. The driving current is applied to a voice coil motor of the actuator so as to move the heads on the disks according to a direction and level of the driving current received from the voice coil motor driver. A spindle motor driver drives the spindle motor according to a rotational control signal generated by the microcontroller for controlling the rotation of the disks.

An earlier spindle motor driver includes a start-up oscillator and a restart oscillator. The start-up oscillator generates a spindle motor rotation control frequency in accordance with a level of a spindle motor driving control voltage to control the rotation of the spindle motor. The start-up oscillator pulls the spindle motor driving control voltage down to 0 upon detecting a back EMF (electromotive force) signal generated by the spindle motor. The restart oscillator generates a restart control signal for periodically restarting a rotation of the spindle motor in case that the spindle motor does not rotate at a steady-state rotation speed within a predetermined time after the spindle motor has been started by the start-up oscillator. The restart control signal controls a level of the spindle motor driving control voltage applied to the start-up oscillator.

Upon the power-up of the hard disk drive, the spindle motor commonly undergoes three operating intervals. The first operating interval is a spindle motor shaking interval at which the spindle motor is shaken and the second operating interval is a spindle motor start interval at which the spindle motor starts rotating and the third operating interval is a running interval at which the spindle motor accelerates and maintains the steady-state rotation speed. In the first operating interval, when the spindle motor driving control voltage is higher than 0 and lower than the predetermined value, the start-up oscillator generates a spindle motor rotational control frequency of 176 Hz in accordance with the spindle motor driving control voltage and shakes the spindle motor in synchronism with the spindle motor rotational control frequency. In the second operating interval, when the spindle motor driving control voltage is higher than the predetermined value and lower than a second predetermined value, the start-up oscillator generates the spindle motor rotation control frequency of 8.6 Hz, and rotates the spindle motor in synchronism with the spindle motor rotation control frequency of 8.6 Hz. Then, the start-up oscillator detects the back EMF generated by the rotating spindle motor and pulls the spindle motor driving control voltage down to 0 upon detecting the back EMF signal. In the third operating interval, the start-up oscillator generates the spindle motor rotation control frequency of 176 Hz in accordance with the spindle motor driving control voltage of 0V, and rotates the spindle motor at the steady state rotation speed in synchronism with the spindle motor rotation control frequency of 176 Hz. In this manner, the spindle motor is controlled during the start-up mode when the stiction error is not generated.

However, after starting a rotation, the spindle motor may stay at the second operating interval for a long time due to the stiction error caused by the friction force between the head and the disk. In case the start-up oscillator delays proceeding to the third operating interval for one cycle of the restart control signal generated by the restart oscillator, the spindle motor driving control voltage is pulled down to a low voltage below the predetermined voltage in synchronism with the restart control signal. Then, the spindle motor again gets into the first operating interval, that is, the spindle motor shaking interval, to remove the stiction.

While a voice coil motor shaking technique is effective in removing the stiction error, it takes at least six or seven seconds to detect the stiction error when the stiction error is generated. Therefore, in case of the stiction error, it is impossible to timely shake the voice coil motor and pass a common drive delay time of fifteen seconds which may result into a system error.

The Boutaghou et al. patent, U.S. Pat. No. 5,530,602, entitled Disk Drive Micromotion Starting Apparatus And Method, discloses a starting arrangement for a rotating disk data storage device which measures the back EMF in the spindle motor windings to indicate the start of disk rotation when a stiction condition has been terminated and applies alternating current pulse burst to the actuator motor to break the stiction between the heads and the disk surfaces.

The Knappe and McAllister et al. patents, U.S. Pat. Nos. 4,970,610 and 5,397,971, entitled respectively Magnetic Disk Drive Start Procedure For Starting Reaction Torque Amplification and Bi-Polar Disk Torquing System For A Disk Drive To Free Stuck Transducers, disclose arrangements in which stiction in a magnetic disk drive is detected and pulses are applied to the spindle motor to break the stiction.

The Plutowski et al. patent, U.S. Pat. No. 5,682,334, entitled Motor Start Acceleration Profile, discloses a motor start acceleration profile arrangement which detects stiction by measuring the motor speed of the spindle motor.

The following patents each disclose features in common with the present invention but are not as pertinent as the patents discussed in detail above: U.S. Pat. No. 4,809,248 to Sengoku, entitled Memory Device Including A Rotating Disk And Means For Detecting Change In Frictional Resistance Between The Disk And A Read/Record Head, U.S. Pat. No. 5,115,664 to Hegde et al., entitled Tunable Feedback Transducer For Transient Friction Measurement, and U.S. Pat. No. 5,539,592 to Banks et al., entitled System And Method For Monitoring Friction Between Head And Disk To Predict Head Disk Interaction Failure In Direct Access Storage Devices.

SUMMARY OF THE INVENTION

It is therefore an object of the present invention to provide a technique for effectively and rapidly shaking a voice coil motor to remove a stiction error caused by friction between a head and a disk in a hard disk drive.

According to an aspect of the present invention, a device for detecting a stiction error of a hard disk drive includes: a start-up oscillator for generating a spindle motor rotation control frequency according to a level of a spindle motor driving control voltage and controlling a rotation of a spindle motor according to the spindle motor rotation control frequency, and a restart oscillator for generating a restart control signal for controlling the level of the spindle motor driving control voltage to restart the rotation of the spindle motor, and includes a resistor interposed between the restart oscillator and ground, for allowing the restart control signal to control the level of the spindle motor driving control voltage, so as to prevent the spindle motor from being restarted, and a microcontroller connected to a node between the restart oscillator and the start-up oscillator, for monitoring the level of the spindle motor driving control voltage to detect a stiction error and for providing a voice coil with a voice coil shaking control signal upon a detection of the stiction error.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail hereinbelow with reference to the attached drawings, in which the like reference numerals used throughout the specification represent the like elements. Further, it should be clearly understood by those skilled in the art that many specifics such as the detailed circuit elements are shown only by way of example to bring a better understanding of the present invention and the present invention may be embodied without the specifics. Moreover, it should be noted that detailed descriptions on the related prior art has been intentionally omitted if it is believed to be unnecessary in describing the concepts of the present invention.

An earlier device for detecting the stiction error to shake the spindle motor upon detection of the stiction error will be described with reference to FIGS. 1 through 5.

Figure 1:
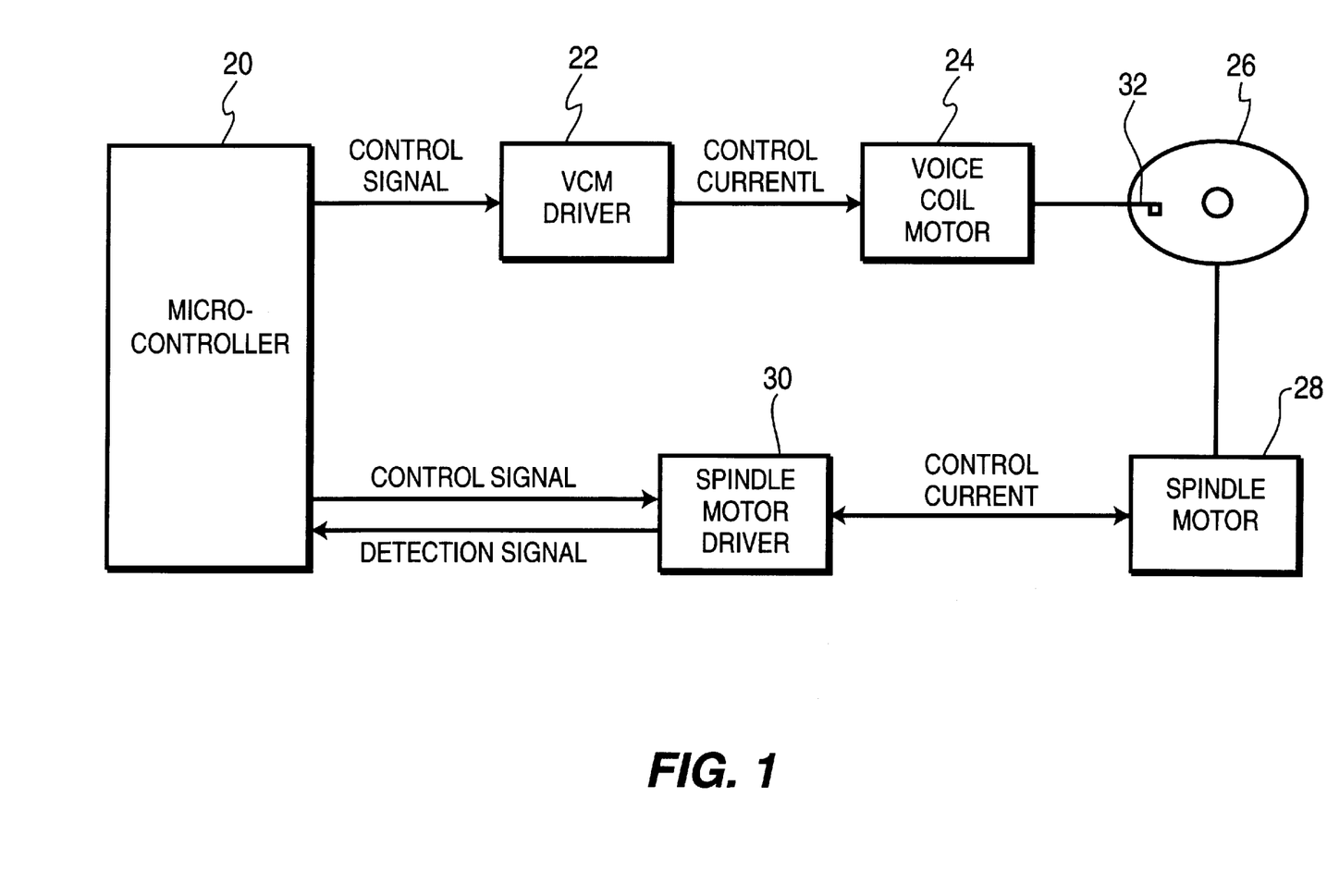
FIG. 1 is a block diagram of a hard disk drive.

FIG. 1 illustrates a block diagram of a hard disk drive. As illustrated, a plurality of disks 26 are rotated by a spindle motor 28. A plurality of magnetic heads 32 are respectively positioned at corresponding surfaces of the disks 26. The magnetic heads 32 are mounted on corresponding support arms each extending toward the disks 26 from an E-block assembly associated with a rotary voice coil actuator. A microcontroller 20 generates overall control commands of the system in response to read and write commands received from a host computer (not shown). A voice coil motor driver 22 generates a driving current for driving an actuator in response to a position control signal, generated by the microcontroller 20, for controlling the position of the heads 32. The driving current is applied to a voice coil motor 24 of the actuator. The voice coil motor 24 moves the heads 32 on the disks 26 according to a direction and level of the driving current received from the voice coil motor driver 22. A spindle motor driver 30 drives the spindle motor 28 according to a rotational control signal, generated by the microcontroller 20, for controlling the rotation of the disks 26.

Figure 2:
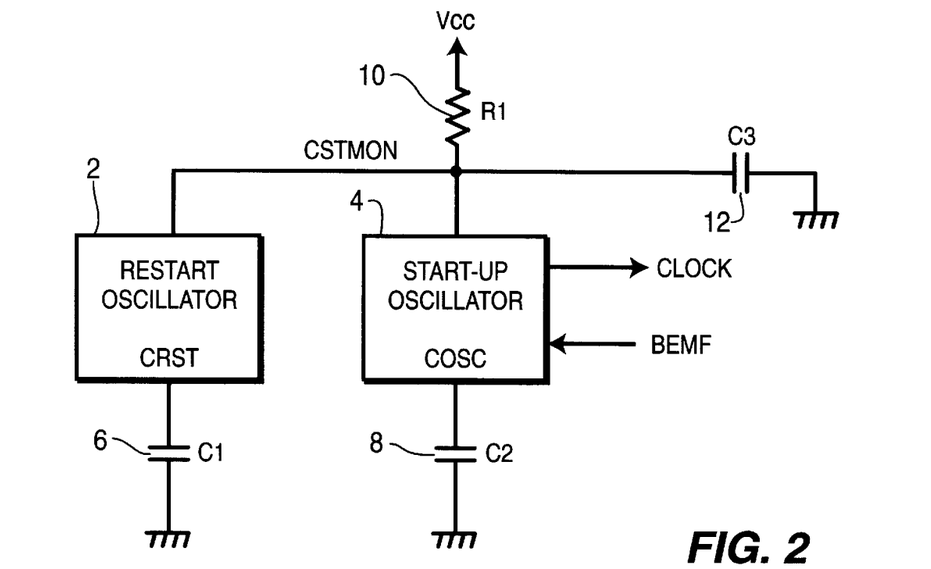
FIG. 2 is a block diagram of an earlier spindle motor driver.
Figure 3A:
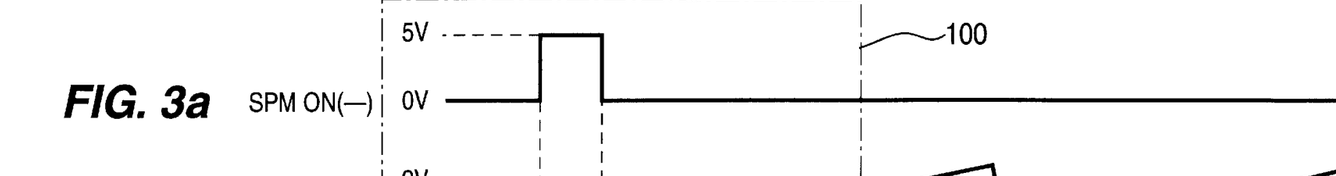
FIG. 3 illustrates waveforms of control signals for controlling an earlier spindle motor.
Figure 3B:
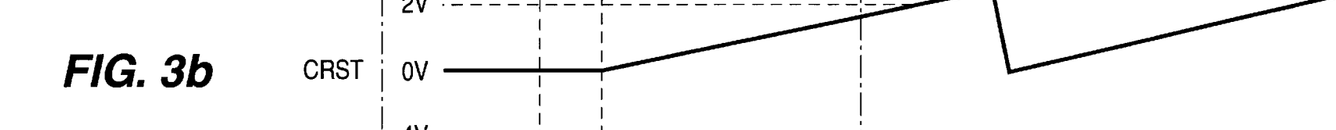
Figure 3C:
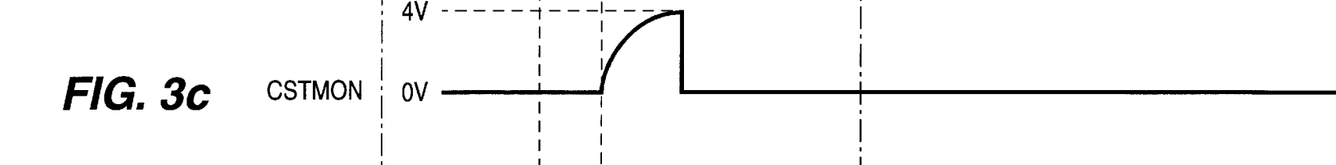
Figure 3D:
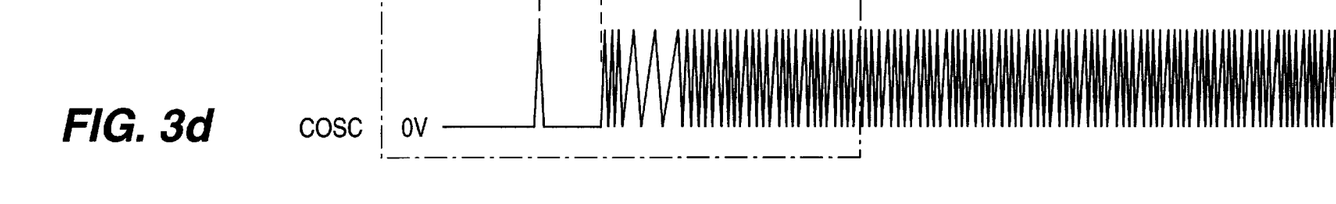

Referring to FIG. 2, the earlier spindle motor driver 30 includes a start-up oscillator 4 and a restart oscillator 2. The start-up oscillator 4 generates a spindle motor rotational control frequency COSC in accordance with a level of a spindle motor driving control voltage CSTMON, to control the rotation of the spindle motor 28. The start-up oscillator 4 pulls the spindle motor driving control voltage CSTMON down to 0V upon detecting a back-EMF (electromotive force) signal BEMF generated by the spindle motor 28. The restart oscillator 2 generates a restart control signal CRST for periodically restarting a rotation of the spindle motor 28 in case the spindle motor 28 does not rotates at a steady-state rotation speed within a predetermined time after the spindle motor 28 has been started by the start-up oscillator 4. The restart control signal CRST controls a level of the spindle motor driving control voltage CSTMON being applied to the start-up oscillator 4.

Figure 4A:
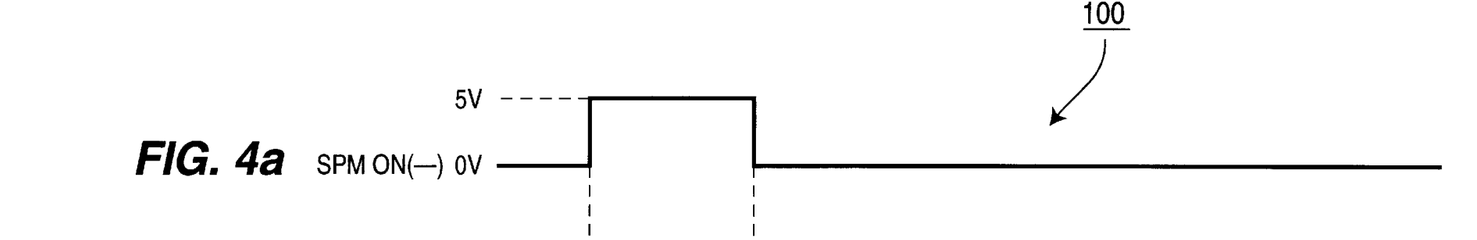
FIG. 4 is an enlarged diagram showing detailed waveforms in a block (100) of FIG. 3.
Figures 4B, 4C:
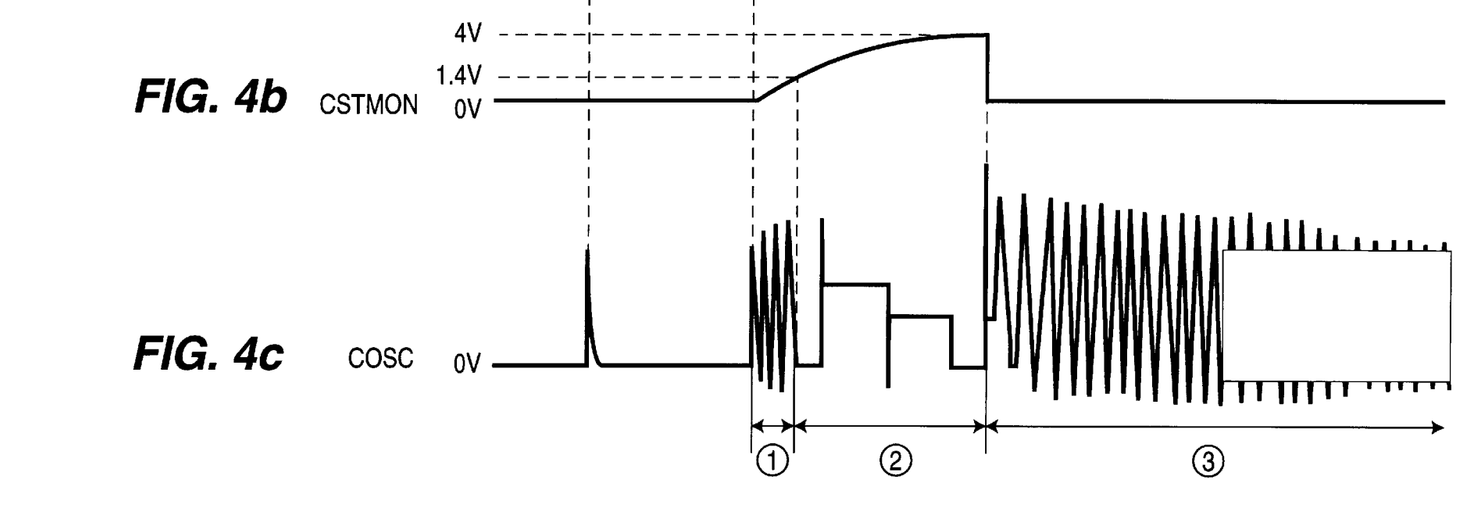
Figure 5A:
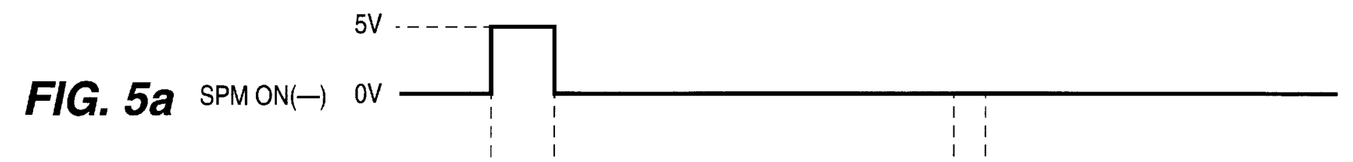
FIG. 5 illustrates waveforms of control signals for controlling a restart operation in case of a stiction error.
Figure 5B:
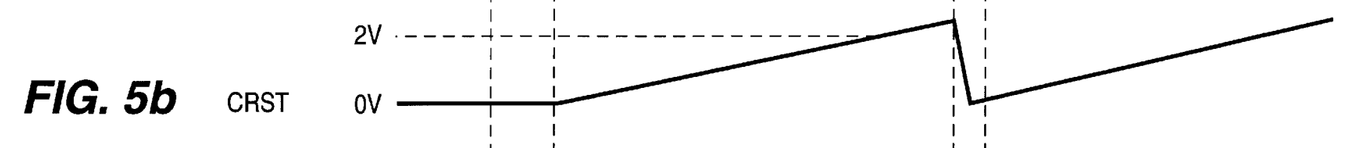
Figure 5C:
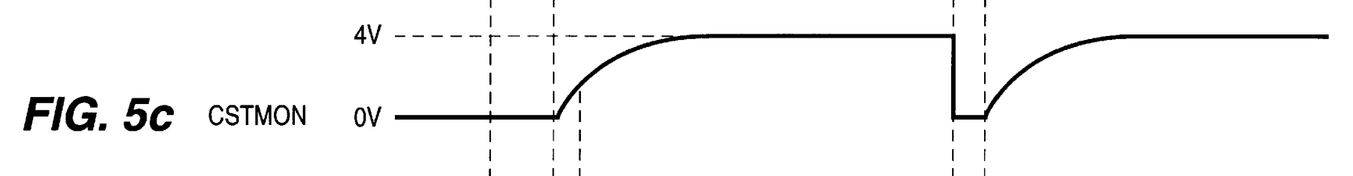
Figure 5D:
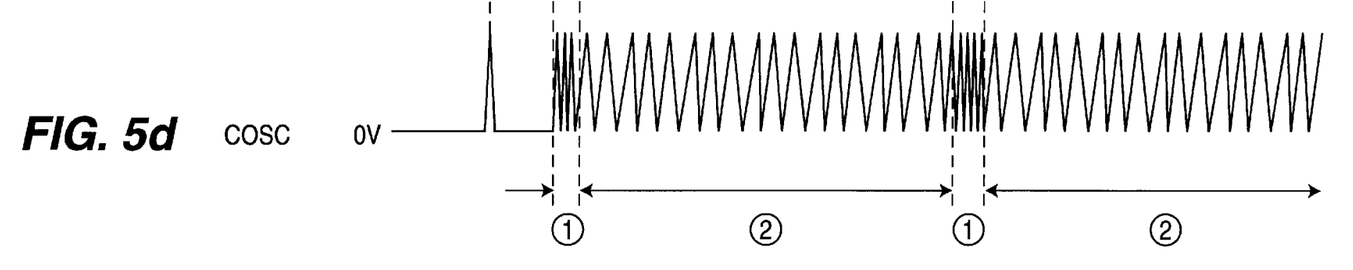

Now, operation of the hard disk drive illustrated in FIGS. 1 and 2 will be described hereinbelow with reference to FIGS. 3 and 4, in which FIG. 3 illustrates waveforms of the control signals for controlling the spindle motor 28 and FIG. 4 is an enlarged diagram of a block 100 of FIG. 3. Referring to FIG. 4, upon the power-up of the hard disk drive, i.e., in a start-up mode, the spindle motor 28 commonly undergoes three operating intervals (1), (2), and (3). The first operating interval (1) is a spindle motor shaking interval at which the spindle motor 28 is shaken. The second operating interval (2) is a spindle motor start interval at which the spindle motor 28 starts a rotating. The third operating interval (3) is a running interval at which the spindle motor 28 accelerates and maintains a steady-state rotation speed. In the first operating interval (1), when the spindle motor driving control voltage CSTMON is higher than 0V and lower than 1.4V, the start-up oscillator 4 generates the spindle motor rotation control frequency COSC of 176 Hz in accordance with the spindle motor driving control voltage CSTMON, and shakes the spindle motor 28 in synchronism with the spindle motor rotation control frequency COSC. In the second operating interval (2), when the spindle motor driving control voltage CSTMON is higher than 1.4V and lower than 5V, the start-up oscillator 4 generates the spindle motor rotation control frequency COSC of 8.6 Hz, and rotates the spindle motor 28 in synchronism with the spindle motor rotation control frequency COSC of 8.6 Hz. Then, the start-up oscillator 4 detects the back-EMF signal BEMF generated by the rotating spindle motor 28, and pulls the spindle motor driving control voltage CSTMON down to 0V upon detecting the back-EMF signal BEMF. In the third operating interval (3), the start-up oscillator 4 generates the spindle motor rotation control frequency COSC of 176 Hz in accordance with the spindle motor driving control voltage CSTMON of 0V, and rotates the spindle motor 28 at the steady-state rotation speed in synchronism with the spindle motor rotation control frequency COSC of 176 Hz. In this manner, the spindle motor is controlled during the start-up mode, in case the stiction error is not generated.

However, referring to FIG. 5, after starting a rotation, the spindle motor 28 may stay at the second operating interval (2) for a long time, due to the stiction error caused by the friction force between the head 32 and the disk 26. In case the start-up oscillator 4 delays proceeding to the third operating interval (3) for one cycle of the restart control signal CRST generated by the restart oscillator 2, the spindle motor driving control voltage CSTMON is pulled down to a low voltage (below 1.4V) in synchronism with the restart control signal CRST. Then, the spindle motor 28 again gets into the first operating interval (1), i.e., the spindle motor shaking interval, to get rid of the stiction.

While a voice coil motor shaking technique is effective in removing the stiction error, it takes at least six or seven seconds to detect the stiction error when the stiction error is generated. Therefore, in case of the stiction error, it is impossible to timely shake the voice coil motor 24 and pass a common drive delay time of fifteen seconds, which may result in a system error.

Figure 6:
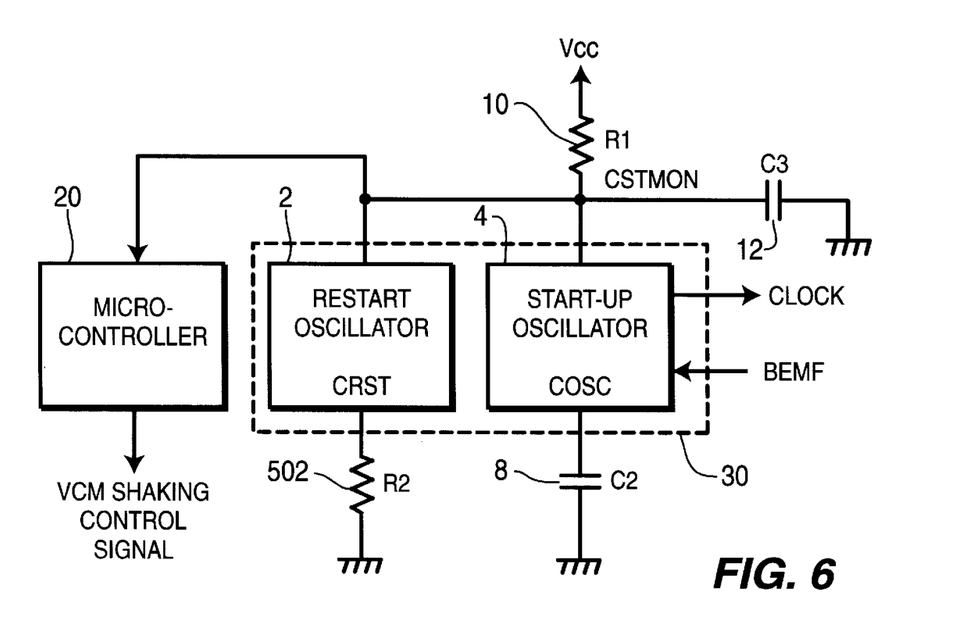
FIG. 6 is a block diagram of a spindle motor driver according to a preferred embodiment of the present invention.

Referring to FIG. 6, a spindle motor driver according to the present invention includes a restart oscillator 2, a start-up oscillator 4, first and second resistors 10 and 502, and first and second capacitors 8 and 12. It should be noted from the drawing that the start-up oscillator 4, the first resistor 10, and the second capacitor 12 have the same configuration and operation as those of the corresponding elements illustrated in FIG. 2. Further, a capacitor 6 of FIG. 2 connected between a restart oscillator 2 and ground to generate the restart control signal CRST is replaced by the second resistor 502, so as to have the restart oscillator 2 not control the spindle motor driving control voltage CSTMON. Besides, a microcontroller 20 is connected to a node between the restart oscillator 2 and the start-up oscillator 4, to detect the spindle motor driving control voltage CSTMON. The microcontroller 20 provides the voice coil motor 24 with a voice coil motor shaking control signal upon detecting the spindle motor driving control voltage CSTMON maintaining a high level for a predetermined time.

Figures 7A, 7B:
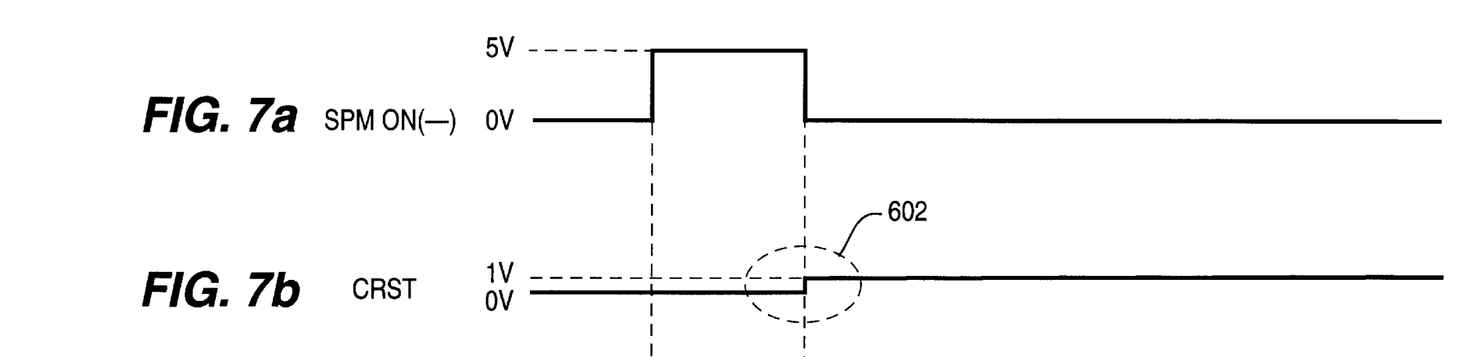
FIG. 7 illustrates waveforms of control signals for controlling the spindle motor according to an embodiment of the present invention.
Figure 7C:
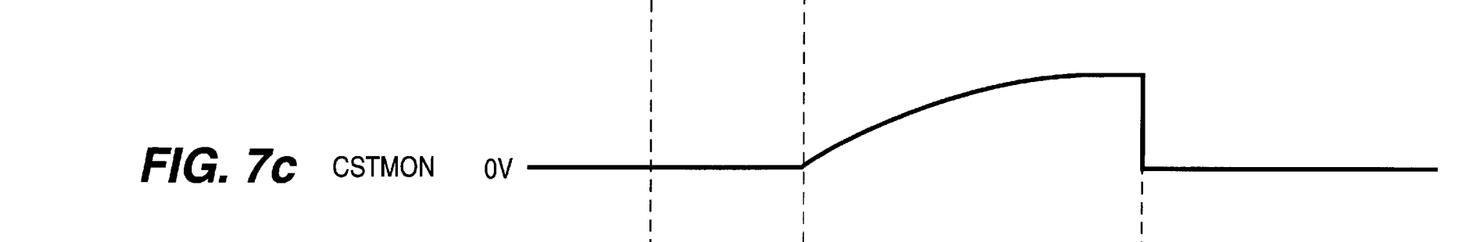
Figure 7D:
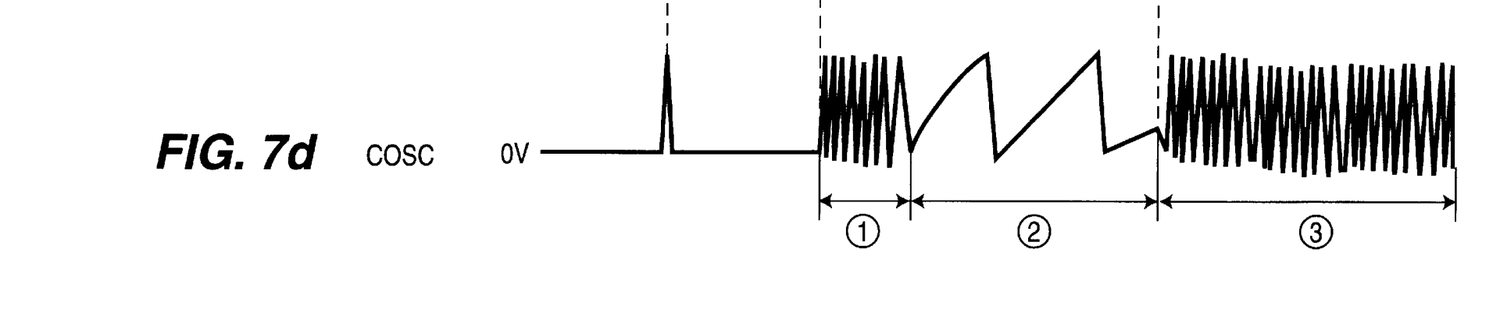
Figure 8A:
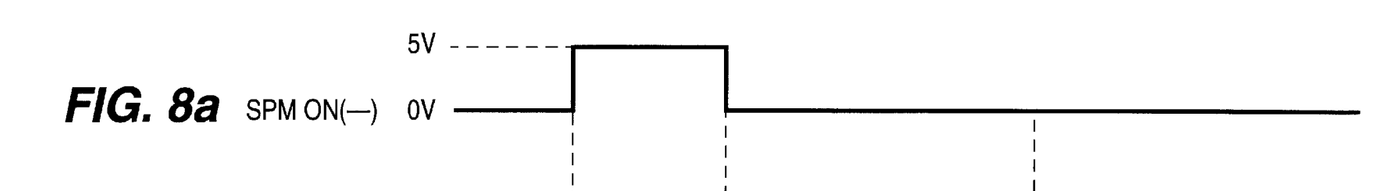
FIG. 8 illustrates waveforms of control signals for controlling a restart operation in case of a stiction error according to an embodiment of the present invention.
Figure 8B:
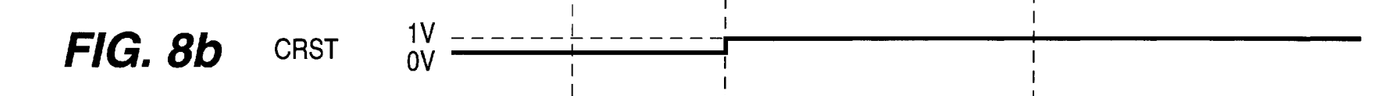
Figure 8C:
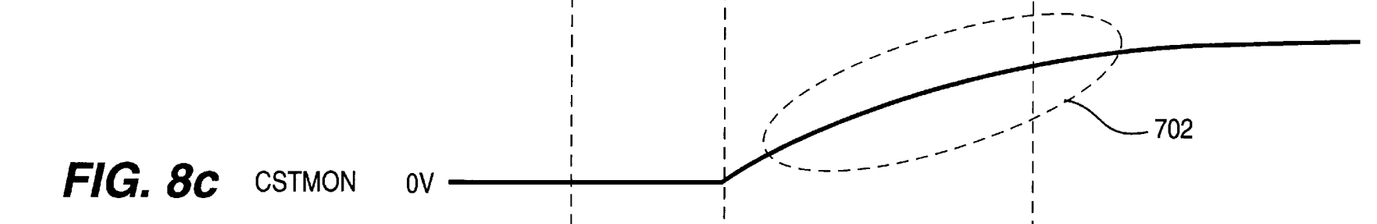
Figure 8D:
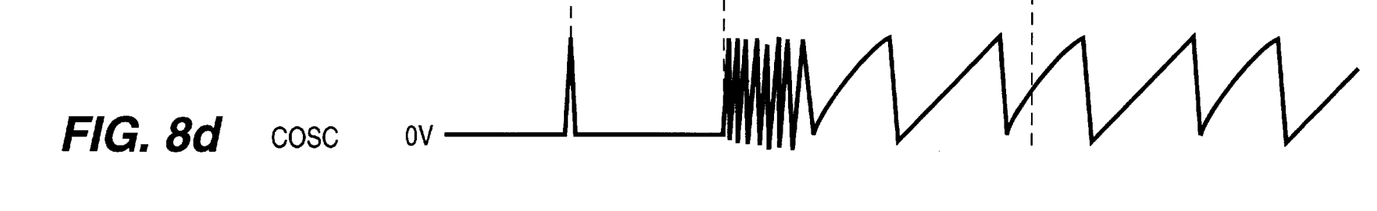

Now, referring to FIG. 7, in the first operating interval (1), when the spindle motor driving control voltage CSTMON is higher than 0V and lower than 1.4V, the start-up oscillator 4 generates the spindle motor rotation control frequency COSC of 176 Hz in accordance with the spindle motor driving control voltage CSTMON, and shakes the spindle motor 28 in synchronism with the spindle motor rotation control frequency COSC. At the moment, the restart control signal CRST generated from the restart oscillator 2 maintains a low level of 1V (see circle 602) which is not high enough to control the spindle motor driving control voltage CSTMON, as illustrated in the drawing. In the second operating interval (2), when the spindle motor driving control voltage CSTMON is higher than 1.4V and lower than 5V, the start-up oscillator 4 generates the spindle motor rotation control frequency COSC of 8.6 Hz, and rotates the spindle motor 28 in synchronism with the spindle motor rotation control frequency COSC of 8.6 Hz. Then, the start-up oscillator 4 detects the back-EMF signal BEMF from the revolving spindle motor 28, and pulls the spindle motor driving control voltage CSTMON down to 0V upon detecting the back-EMF signal BEMF. In the third operating interval (3), the start-up oscillator 4 generates the spindle motor rotation control frequency COSC of 176 Hz in accordance with the spindle motor driving control voltage CSTMON of 0V, and rotates the spindle motor 28 at the steady-state rotation speed in synchronism with the spindle motor rotation control frequency COSC of 176 Hz. In this manner, the spindle motor is normally controlled during the start-up mode, in case there is no stiction error.

However, referring to FIG. 8, after being started by the start-up oscillator 4, the spindle motor 28 may stay at the second operating interval (2) for a long time, due to the stiction error caused by the friction force between the head 32 and the disk 26. On the contrary to the earlier device, even though the start-up oscillator 4 delays proceeding to the third operating interval (3) for a predetermined time interval (i.e., a time interval represented by circle 702), the spindle motor driving control voltage CSTMON maintains its voltage level. Then, the microcontroller 20 connected to the node between the restart oscillator 2 and the start-up oscillator 4 detects the spindle motor driving control voltage CSTMON maintaining the voltage level, so as to generate a voice coil motor shaking control signal upon the detection.

As can be clearly appreciate from the foregoing descriptions, since the capacitor 6 of FIG. 2 is replaced by the second resistor 502, the restart control signal CRST maintains the constant voltage level of 1V through the first to third operation intervals (1) through (3), thereby preventing the spindle motor 28 from being restarted. Accordingly, the microcontroller 20 detects the stiction error more rapidly by simply detecting the spindle motor driving control voltage CSTMON maintaining the voltage level. The microcontroller 20 generates the voice coil motor shaking control signal upon the detection, to remove the stiction error by shaking the voice coil motor 24.

Figure 9:
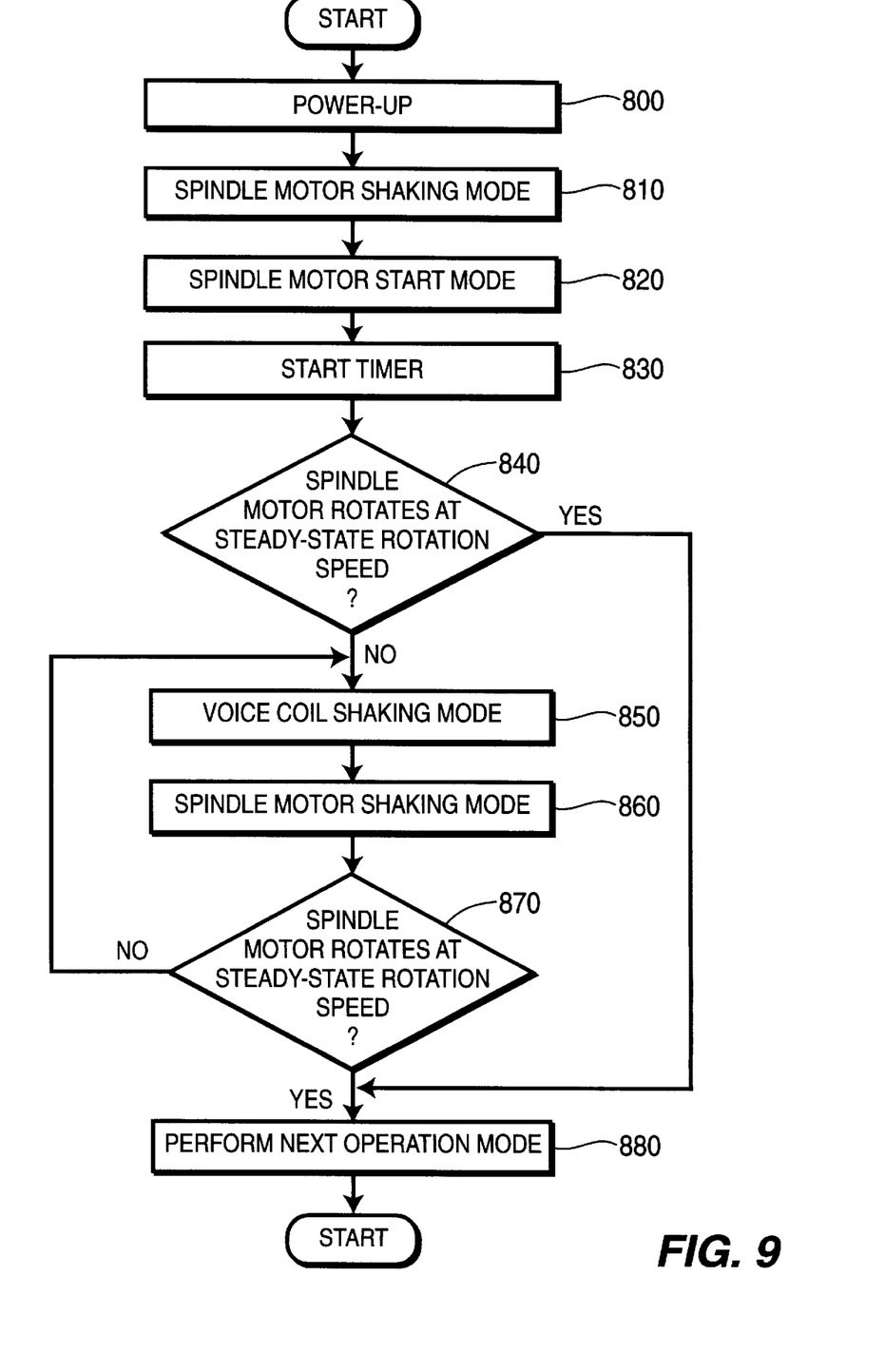
FIG. 9 is a flowchart for shaking a voice coil motor in case of the stiction error according to an embodiment of the present invention.

FIG. 9 illustrates a flowchart for shaking a voice coil motor in case of stiction error according to an embodiment of the present invention. As illustrated, the system is powered up at step 800. Then, at step 810, the microcontroller 20 provides the start-up oscillator 4 with the spindle motor driving control voltage CSTMON to generate the spindle motor rotation control frequency COSC of 176 Hz. Then, the start-up oscillator 4 provides the spindle motor 28 with the spindle motor rotation control frequency COSC of 176 Hz, to shake the spindle motor 28 in synchronism with the spindle motor rotation control frequency COSC. At step 820, the microcontroller 20 provides the start-up oscillator 4 with the spindle motor driving control voltage CSTMON to generate the spindle motor rotation control frequency COSC of 8.6 Hz. Then, the start-up oscillator 4 provides the spindle motor 28 with the spindle motor rotation control frequency COSC of 8.6 Hz, to rotates the spindle motor 28 in synchronism with the spindle motor rotation control frequency COSC. At the moment, the microcontroller 20 starts a counter or timer (not shown) at step 830. The microcontroller 20 checks, at a step 840, whether or not the spindle motor 28 is accelerated to the steady-state rotation speed within a predetermined time, by detecting the back-EMF signal BEMF and how long the spindle motor driving control voltage CSTMON maintains its high voltage level in response to the back-EMF signal BEMF.

If the spindle motor 28 is accelerated to the steady-state rotation speed within a predetermined time, the microcontroller 20 will proceed to step 880 to perform a next operation mode. However, if the spindle motor 28 is not accelerated to the steady-state rotation speed within a predetermined time, the microcontroller 20 provides the voice coil motor 24 with the voice coil motor shaking control signal to shake the voice coil motor 24, at step 850. At step 860, the microcontroller 20 again provides the start-up oscillator 4 with the spindle motor driving control voltage CSTMON to generate the spindle motor rotation control frequency COSC of 8.6 Hz. Then, the start-up oscillator 4 provides the spindle motor 28 with the spindle motor rotation control frequency COSC of 8.6 Hz, to rotates the spindle motor 28 in synchronism with the spindle motor rotation control frequency COSC. The microcontroller 20 checks again, at step 870, whether or not the spindle motor 28 is accelerated to the steady-state rotation speed within the predetermined time. If the spindle motor 28 is accelerated to the steady-state rotation speed within a predetermined time, the microcontroller 20 will proceed to step 880 to perform the next operation mode. However, if the spindle motor 28 is not accelerated to the steady-state rotation speed within a predetermined time, the procedure will return to step 850 to repeat step 850 and its succeeding steps. It should be understood that the procedure may further include a step for checking whether the number of repetitions of step 870 has reached a predetermined number of times, so as to prevent the procedure from getting into an endless loop.

In the light of the foregoing, the hard disk drive of the invention effectively and rapidly shakes a voice coil motor to remove a stiction error caused by friction between a head and a disk in a hard disk drive, so that the system may be stabilized.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A device for detecting a stiction error of a hard disk drive including a start-up oscillator for generating a spindle motor rotation control frequency according to a level of a spindle motor driving control voltage and controlling a rotation of a spindle motor according to the spindle motor rotation control frequency, and a restart oscillator for generating a restart control signal for controlling the level of the spindle motor driving control voltage to restart the rotation of the spindle motor, comprising:

a resistor interposed between said restart oscillator and ground, for allowing the restart control signal to control the level of the spindle motor driving control voltage, so as to prevent the spindle motor from being restarted; and a microcontroller connected to a node between the restart oscillator and the start-up oscillator, for monitoring the level of the spindle motor driving control voltage to detect a stiction error and provide a voice coil with a voice coil shaking control signal upon a detection of the stiction error.

2. A method of detecting a stiction error of a hard disk drive including a start-up oscillator for generating a spindle motor rotation control frequency according to a level of a spindle motor driving control voltage and controlling a rotation of a spindle motor according to the spindle motor rotation control frequency, and a restart oscillator for generating a restart control signal for controlling the level of the spindle motor driving control voltage to restart the rotation of the spindle motor, a resistor interposed between said restart oscillator and ground, for allowing the restart control signal to control the level of the spindle motor driving control voltage, so as to prevent the spindle motor from being restarted, a microcontroller connected to a node between the restart oscillator and the start-up oscillator, for monitoring the level of the spindle motor driving control voltage to detect a stiction error and provide a voice coil with a voice coil shaking control signal upon a detection of the stiction error, comprising the steps of:

starting a rotation of the spindle motor upon a power-up and checking whether the spindle motor is accelerated to a steady-state rotation speed within a predetermined time; and if the spindle motor has not accelerated to the steady-state rotation speed within the predetermined time, providing the voice coil motor with the voice coil motor shaking control signal to shake the voice coil motor.

3. A method of detecting a stiction error of a hard disk drive according to claim 2, the rotation speed of the spindle motor being determined based on a measurement of a back-EMF (electromotive force) signal generated by the spindle motor.

4. A method of detecting a stiction error of a hard disk drive according to claim 2, the rotation speed of the spindle motor being determined based on a measurement of how long the spindle motor driving control voltage maintains a high voltage level in response to a back-EMF signal.

5. A method of detecting a stiction error of a hard disk drive, the method comprising:

powering up a spindle motor of a hard disk drive;

causing the spindle motor to be operated in a shaking mode;

causing the spindle motor to be placed in a start mode and starting a timer to measure the elapsed time of the spindle motor being in a start mode;

determining if the spindle motor is rotating at a steady state rotation speed within a predetermined elapsed time;

if the spindle motor is rotating at a steady state rotation speed within the predetermined elapsed time, then performing a next operation mode and alternatively, if the spindle motor fails to rotate at a steady state rotation speed within the predetermined elapsed time, placing a voice coil motor of the hard disk drive in a shaking mode;

placing the spindle motor in the start mode; and determining whether the spindle motor is rotating at a steady state rotation speed and if so, performing the next operation mode and alternatively, if not, repeating the placing of the voice coil in the voice coil shaking mode.

6. A method of detecting a stiction error of a hard disk drive according to claim 5, the rotation speed of the spindle motor being determined based on a measurement of a back-EMF (electromotive force) signal generated by the spindle motor.

7. A method of detecting a stiction error of a hard disk drive according to claim 5, the rotation speed of the spindle motor being determined based on a measurement of how long the spindle motor driving control voltage maintains a high voltage level in response to a back-EMF signal.

* * * * *

UNITED STATES PATENT AND TRADEMARK OFFICE
CERTIFICATE OF CORRECTION

PATENT NO. : 6,072,652
DATED : 6 June 2000
INVENTOR(S) : Bong-Jin Lee

It is certified that error appears in the above-indentified patent and that said Letters Patent is hereby corrected as shown below:

IN THE TITLE PAGE

[73] Assignee: SamSung Electronics Co., Ltd.
 change "Suwon, Japan" to - - Suwon, Korea - - ;

Insert - - [30] Foreign Application Priority Data
 December 20, 1996 [KR]  Rep. of Korea . . . 96-69199 - - :

Signed and Sealed this

Third Day of April, 2001

Attest:

NICHOLAS P. GODICI

Attesting Officer  Acting Director of the United States Patent and Trademark Office